3,264,282
LINCOMYCIN CYCLIC CARBONATE ESTERS AND PROCESS FOR PREPARING THE SAME
William Schroeder, Scotts, Mich., assignor to The Upjohn Company, Kalamazoo, Mich., a corporation of Delaware
No Drawing. Filed Apr. 13, 1964, Ser. No. 359,420
12 Claims. (Cl. 260—210)

This invention relates to novel derivatives of the antibiotic lincomycin and to processes for the preparation thereof, and is particularly directed to cyclic carbonate and cyclic thiocarbonate esters of lincomycin.

Lincomycin is an antibiotic as an elaboration product of a lincomycin-producing actinomycete. Methods for the production, recovery and purification of lincomycin are described in U.S. Patent 3,086,912.

It has now been found that novel compounds according to this invention are obtained by treating lincomycin with carbonic acid esters, N,N'-carbonyldiimidazole or 4,4'-carbonyl-di-1,2,4-triazole, to give lincomycin cyclic carbonate, and thiocarbonic acid esters, N,N'-thiocarbonyldiimidazole or 4,4'-thiocarbonyl-di-1,2,4-triazole, to give lincomycin cyclic thiocarbonate. Subsequent to this invention, the structure of lincomycin has been elucidated. The novel compounds of the invention therefore can now be represented by the following formula:

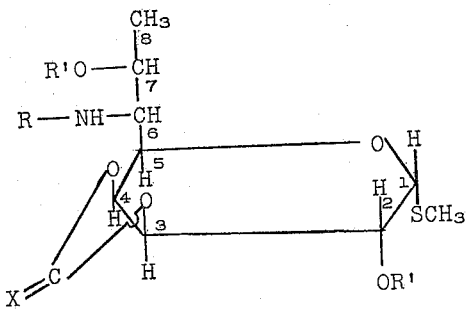

wherein X is O or S; wherein R is trans-4-propyl-L-hygroyl and wherein R' is selected from the group consisting of hydrogen and hydrocarbon carboxylic acid acyl radical containing from 2 to 12 carbon atoms.

The term "hydrocarbon carboxylic acid acyl radical containing from 2 to 12 carbon atoms" whenever used in the specification or claims is intended to mean an acyl radical corresponding to a hydrocarbon carboxylic acid of from 2 to 12 carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, and naphthylacetic acid, and the like.

The novel compound of the invention, lincomycin cyclic carbonate, can be prepared by reacting lincomycin with a carbonic acid ester. For example, upon reacting lincomycin base with methyl carbonate at a temperature of 50-90° C. there is obtained lincomycin cyclic carbonate. Other carbonic acid esters, such as ethyl, methyl ethyl, and methyl propyl can be used in the above reaction to make lincomycin cyclic carbonate.

Alternatively, lincomycin cyclic carbonate can be obtained by reacting lincomycin with N,N'-carbonyldiimidazole or 4,4'-carbonyl-di-1,2,4-triazole in approximately equimolar quantities.

Lincomycin cyclic thiocarbonate can be obtained by reacting lincomycin with N,N'-thiocarbonyldiimidazole or 4,4'-thiocarbonyl-di-1,2,4-triazole in approximately equimolar quantities.

2,7-diacylates of lincomycin cyclic carbonate can be prepared from lincomycin cyclic carbonate by treating lincomycin cyclic carbonate with an acid halide or anhydride of the appropriate hydrocarbon carboxylic acid in the presence of a tertiary amine. Suitable tertiary amines include pyridine, quinoline, isoquinoline; trialkylamines, such as trimethylamine, triethylamine, triisopropylamine, and the like; N,N-dialkylanilines, such as dimethylaniline, diethylaniline, and the like; and N-alkylpiperidines, such as N-ethylpiperidine, N-methylpiperidine, and the like. The preferred base is pyridine. The reaction is effected in a convenient manner by treating a suspension of lincomycin cyclic carbonate in the tertiary amine with an acid halide or anhydride and heating the resulting mixture, if desired, for a short period at about 100° C. to complete the reaction. The reaction mixture can be decomposed in a simple and convenient manner by addition of water and the desired product isolated by conventional procedure. Upon reacting lincomycin cyclic carbonate in the presence of a tertiary amine with at least two moles of acylating agent, there is obtained lincomycin cyclic carbonate diacylate. For example, upon reacting lincomycin cyclic carbonate in pyridine with at least two moles of acetic anhydride there is obtained lincomycin cyclic carbonate 2,7-diacetate.

When the molar ratio of acid halide or anhydride to lincomycin cyclic carbonate employed is less than 2:1, the reaction product normally would be a mixture of partially acylated compound (i.e., mono-, diacylate). Such a mixture can be separated into its component parts by conventional procedures, for example, using counter current distribution procedures or using partition chromatography.

Acylates of lincomycin cyclic thiocarbonate can be prepared in the same manner as disclosed above.

The novel compounds of the invention, lincomycin cyclic carbonate and cyclic thiocarbonate, can exist either in the non-protonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free base.

The novel compounds of the invention have antibacterial activity and, therefore, can be used in various environments to inhibit the growth of susceptible microorganisms. For example, lincomycin cyclic carbonate inhibits the growth of Escherichia coli, and, therefore, is useful for controlling the combination caused by this microorganism in used cutting oils and in paper mill systems where Escherichia coli has been associated with slime formation. Further, lincomycin cyclic carbonate inhibits the growth of Klebsiella pneumoniae, Pseudomonas aeruginosa, Salmonella gallinarum, Salmonella schottmuelleri, Staphylococcus albus, Staphylococcus aureus, and Streptococcus faecalis in a brain heart infusion broth test. Therefore, lincomycin cyclic carbonate is useful as a disinfectant on washed and stacked food utensils contaminated with Staphylococcus aureus, or Staphylococcus albus; also, it can be used as a disinfectant on various dental and medical equipment contaminated with these organisms. Further, lincomycin cyclic carbonate can be used as a disinfectant in poultry plants to inhibit the growth of Salmonella gallinarum which has been found to be a causative agent of fowl typhoid; it can also be incorporated into fish meal that is used in animal feed supplements to prevent contamination by Salmonella gallinarum.

The following examples are illustrative of the process and product of the present invention but are not to be construed as limiting.

PREPARATION OF LINCOMYCIN

Lincomycin can be prepared in accordance with procedures set out in U.S. Patent 3,086,912.

*Example 1.—Lincomycin cyclic carbonate*

A mixture of 10 gm. of lincomycin base and 50 ml. of redistilled methyl carbonate was heated to boiling and methanol and methyl carbonate distilled out during 15 minutes. The residual solution (approximately 30 ml.) was cooled to 35° and 100 ml. of ether was added. A gelatinous precipitate formed immediately. After stirring at room temperature for 30 min., the precipitate was collected and washed with ether. After drying in vacuo for several hours at 35° C., there was obtained 7.5 gm. of lincomycin cyclic carbonate as a white amorphous powder having an optical rotation $[\alpha]_D^{25} = +57°$ (c.=0.636 in $CH_2Cl_2$); IR bands at 3300, 3120, 1810 sh, 1790, 1760 sh, 1650 sh, 1640, 1550, 1525, 1255, 1150, 1035, 960, 890, 865, 770 cm.$^{-1}$; and the following elemental analysis:

Calculated for $C_{19}H_{32}N_2O_7S$: C, 52.77; H, 7.46; N, 6.48; S, 7.41. Found: C, 52.35; H, 7.69; N, 6.16; S, 7.27.

S. aureus infected mice were protected subcutaneously with a $CD_{50}$ of 32 (21–43 mg./kg. of lincomycin cyclic carbonate and orally with a $CD_{50}$ of 28 (21–35) mg./kg. of lincomycin cyclic carbonate.

*Example 2.—Lincomycin cyclic carbonate*

In a dry 3 liter flask were placed 40.7 gm. (0.1 mole) of lincomycin, 2000 ml. of dry tetrahydrofuran and 16.2 gm. (0.1 mole) of bisimidazole carbonyl. The solution was heated at about 40° C. under a nitrogen atmosphere for one hour and the solvent then evaporated under vacuum. The viscous residue was dissolved in 1000 ml. of methylene chloride and extracted vigorously with about 250-ml. portions of water. The methylene chloride phase was separated, dried over anhydrous magnesium sulfate, filtered, and evaporated under vacuum to yield 35 gm. of lincomycin cyclic carbonate as a white solid, having physical and chemical characteristics as given above.

*Example 3.—2,7-diacetyl lincomycin cyclic carbonate*

A 4.3 g. quantity of lincomycin cyclic carbonate is stored for 3 days in a dry pyridine solution containing 2.1 g. of acetic anhydride. This mixture is then treated with 1 ml. of water and evaporated to dryness under reduced pressure. The residue is dissolved in 100 ml. of ethyl acetate and washed twice with 50 ml. of cold 5% bicarbonate, then with three 50-ml. portions of water. The ethyl acetate solution is dried over anhydrous magnesium sulfate, then filtered and evaporated on a rotary evaporator to dryness. The residue, 2,7-diacetyl lincomycin cyclic carbonate, is characterized by infrared absorptions at about 1810, 1740, 1655, and 1510 cm.$^{-1}$.

*Example 4*

By substituting the acetic anhydride in Example 3 by propionic, succinic, maleic, and phthalic anhydride there is obtained the corresponding 2,7-dipropionyl-, 2,7-bis(hemisuccinyl), 2,7-bis(hemimaleyl) and 2,7-bis(hemiphthaloyl) lincomycin cyclic carbonate.

*Example 5*

By substituting the acetic anhydride and pyridine in Example 3 by acetyl chloride, propionyl bromide, butyryl chloride, valeryl chloride, caproyl chloride, heptanoyl chloride, and caprylyl chloride and at least a stoichiometric amount of triethylamine there is obtained the corresponding 2,7-diacetyl-, 2,7-dipropionyl-, 2,7-dibutyryl-, 2,7-divaleryl-, 2,7-dicaproyl-, 2,7-diheptanoyl-, and 2,7-dicaprylyl lincomycin cyclic carbonate.

*Example 6*

By substituting the N,N'-carbonyldiimidazole in Example 2 by an equimolar amount of 4,4'-carbonyl-di-1,2,4-triazole, there is obtained lincomycin cyclic carbonate.

*Example 7.—Lincomycin cyclic thiocarbonate*

In a dry 3-liter flask were placed 34.2 g. (0.08 mole) of lincomycin, 14.9 g. (0.08 mole) of N,N'-thiocarbonyldiimidazole and 2-liters of tetrahydrofuran. This solution was heated at reflux under nitrogen for 6 hours and then evaporated under vacuum at a pot temperature of less than 60°. The viscous residue was shaken with 1500 ml. of ether and 500 ml. of water until solution was complete. The water layer was discarded and the ether layers washed five times with 200 ml. portions of water. The ether layer was then dried over anhydrous $MgSO_4$, filtered and evaporated to dryness under vacuum. The crude residue weighed 23.2 g. Three grams of this material was chromatographed over 300 g. of silica gel (elution with 100% acetone). After discarding a forerun of 250 ml., 20 ml. fractions were collected, and evaporated. Fractions 12–15 were crystalline lincomycin cyclic thiocarbonate (775 mg.), and showed one spot on thin layer chromatography (silica gel, 100% acetone). They were combined and recrystallized from acetone to yield crystals having a melting point of 183–184° C.

*Analysis.*—Calcd. for $C_{19}H_{32}N_2O_6S_2$: C, 50.87; H, 7.19; N, 6.25; S, 14.30. Found: C, 51.10; H, 6.97; N, 6.23; S, 14.19.

*Example 8*

By substituting the lincomycin cyclic carbonate in Example 3 by an equimolar amount of lincomycin cyclic thiocarbonate, there is obtained 2,7-diacetyl lincomycin cyclic thiocarbonate.

*Example 9*

By substituting the lincomycin cyclic carbonate in Example 3 by an equimolar amount of lincomycin cyclic thiocarbonate, and the acetic anhydride by propionic, succinic, maleic, and phthalic anhydride there is obtained the corresponding 2,7-dipropionyl-, 2,7-bis(hemisuccinyl), 2,7-bis(hemimaleyl) and 2,7-bis(hemiphthaloyl) lincomycin cyclic thiocarbonate.

Example 10

By substituting the lincomycin cyclic carbonate in Example 3 by an equimolar amount of lincomycin cyclic thiocarbonate, and the acetic anhydride by acetyl chloride, porpionyl bromide, butyryl chloride, valeryl chloride, caproyl chloride, heptanoyl chloride, and caprylyl chloride, and the pyridine by at least a stoichiometric amount of triethylamine there is obtained the corresponding 2,7-diacetyl-, 2,7-dipropionyl-, 2,7-dibutyryl-, 2,7-divaleryl-, 2,7-dicaproyl-, 2,7-diheptanoyl-, and 2,7-dicaprylyl lincomycin cyclic thiocarbonate.

Example 11

By substituting the N,N'-thiocarbonyldiimidazole in Example 7 by an equimolar amount of 4,4'-thiocarbonyl-di-1,2,4-triazole there is obtained lincomycin cyclic thiocarbonate.

I claim:
1. A compound of the formula:

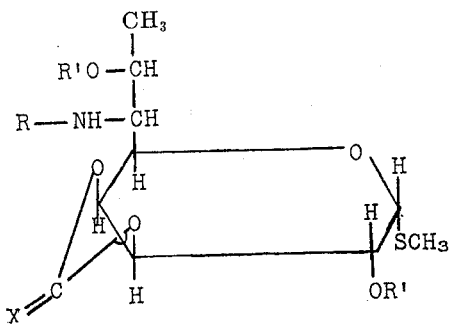

wherein X is O or S; wherein R is trans-4-propyl-L-hygroyl and R' is selected from the group consisting of hydrogen and hydrocarbon carboxylic acid acyl radical containing from 2 to 12 carbon atoms.

2. Lincomycin cyclic carbonate, a compound of the formula:

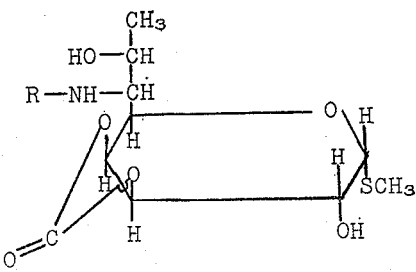

wherein R is trans-4-propyl-L-hygroyl.

3. The acid addition salts of the compound of claim 1.
4. Lincomycin cyclic thiocarbonate, a compound of the formula:

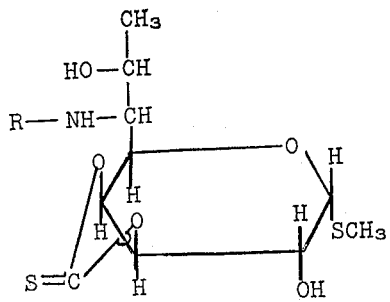

wherein R is trans-4-propyl-L-hygroyl.

5. A compound of the formula:

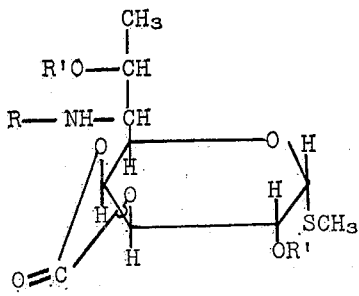

wherein R is trans-4-propyl-L-hygroyl and R' is selected from the group consisting of hydrocarbon carboxylic acid acyl radical containing from 2 to 12 carbon atoms.

6. A compound of the formula:

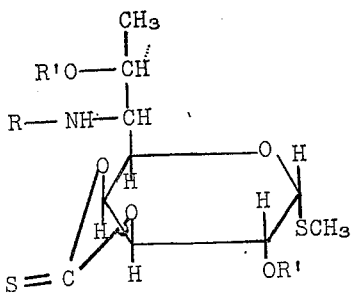

wherein R is trans-4-propyl-L-hygroyl and R' is selected from the group consisting of hydrocarbon carboxylic acid acyl radical containing from 2 to 12 carbon atoms.

7. 2,7-diacetyl lincomycin cyclic carbonate which the following structural formula:

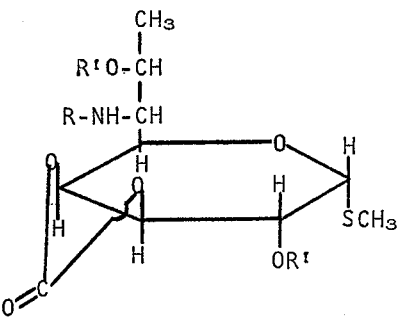

wherein R is trans-4-propyl-L-hygroyl and wherein R' is acetyl.

8. A process for making the compound of the formula in claim 2 which comprises reacting lincomycin with a carbonic acid ester selected from the group consisting of methyl, ethyl, methyl ethyl, and methyl propyl carbonate at a temperature of about 50–90° C.

9. A process for making lincomycin cyclic carbonate which comprises heating lincomycin and methyl carbonate to boiling, removing the methanol and methyl carbonate from the reaction vessel, cooling the residual solution, and isolating lincomycin cyclic carbonate therefrom.

10. A process for producing 2,7-diacyllincomycin cyclic carbonate which comprises (1) reacting lincomycin with a carbonic acid ester selected from the group consisting of methyl, ethyl, methyl ethyl, and methyl propyl carbonate, at a temperature in the range of about 50–90° C. to produce lincomycin cyclic carbonate, (2) reacting lincomycin cyclic carbonate with an acylating agent selected from the group consisting of acid anhydrides and acid halides of hydrocarbon carboxylic acids of from 2 to 12 carbon atoms, and (3) isolating the 2,7-diacyl-lincomycin cyclic carbonate so produced.

11. A process for making 2,7-diacetyllincomycin cyclic carbonate which comprises (1) heating lincomycin with methyl carbonate at a boiling temperature, (2) removing methanol and methyl carbonate from the reaction vessel, (3) isolating lincomycin cyclic carbonate from the residue, and (4) reacting lincomycin cyclic carbonate with acetic anhydride in the presence of pyridine to produce 2,7-diacetyllincomycin cyclic carbonate.

12. A process for producing 2,7-diacyllincomycin cylic thiocarbonate which comprises (1) reacting lincomycin with a carbonic acid ester selected from the group consisting of methyl, ethyl, methyl ethyl, and methyl propyl carbonate, at a temperature in the range of about 50–90° C to produce lincomycin cyclic thiocarbonate, (2) reacting lincomycin cyclic thiocarbonate with an acylating agent selected from the group consisting of acid anhydrides and acid halides of hydrocarbon carboxylic acids of from 2 to 12 carbon atoms; and (3) isolating the 2,7-diacyllincomycin cyclic thiocarbonate so produced.

References Cited by the Examiner

Pigman: The Carbohydrates, 1957, Academic Press Inc., New York, N.Y. pp. 139–151.

LEWIS GOTTS, *Primary Examiner.*

JOHNNIE R. BROWN, *Assistant Examiner.*